United States Patent Office 3,839,384
Patented Oct. 1, 1974

3,839,384
POLYETHER URETHANE FOAM
Edward Lewis Morehouse, New City, N.Y., assignor to Union Carbide Corporation, New York, N.Y.
No Drawing. Filed Nov. 13, 1972, Ser. No. 305,713
Int. Cl. C07f 7/08
U.S. Cl. 260—448.2 R
14 Claims

ABSTRACT OF THE DISCLOSURE

A process for producing high resilience polyether urethane foam using an aralkyl modified siloxane oil; the foams derived therefrom; a solvent-solution of said siloxane oil; and aralkyl modified siloxane oils per se.

BACKGROUND OF THE INVENTION

This invention relates to high resilience polyurethane foams and more particularly to the use of certain organosilicon surfactants in the production of such foams.

Basically such high resilience foams are produced by the reaction of highly primary hydroxyl-capped, high molecular weight polyols with organic isocyanates and water. High resilience polyurethane foams are distinguishable in part from conventional hot cure polyurethane foams by the use of such polyols and the fact that high resilience polyurethane foams require little or no oven curing and thus are often referred to as cold cure foams. Such foams are extremely desirable for cushioning applications because of their excellent physical properties, e.g. very high foam resiliency, low flammability, open-celled structure, low flex fatigue (long life) and high SAC factors (load bearing properties).

Because of the high reactivity of high resilience foam ingredients and their rapid buildup of gel strength, sometimes the foam can be obtained without a surfactant, however such foams typically have very irregular cell structure as particularly evidenced by surface voids and the discovery of a proper surfactant agent to help control cell structure has remained a major problem in the art.

Attempts to solve this problem with surfactants generally employed in the stabilization of hot cure polyurethane foam have not proven satisfactory because such surfactants tend to overstabilize, causing extremely tight, shrinkaging foam. Nor is the problem corrected by reducing the concentrations of such surfactants, since at concentrations required to eliminate shrinkage, the cells are no longer stabilized satisfactorily and the foam structure becomes irregular, coarse and contains surface voids.

The use of low viscosity dimethylsilicone oils as stabilizers for high resilience foams also has various disadvantages. For example, at low concentrations they create metering and pumping problems in the processing of the foam, while at higher concentrations these oils adversely affect the physical properties of the foam. Solvents for such dimethylsiloxane oils that are non-reactive with the foam ingredients e.g. alkanes, hexamethyldisiloxane, and the like, can adversely affect the foam's physical properties in proportion to their concentration and generally create flammability hazards. Furthermore isocyanate reactive diluents, such as polyether triols and the like which do not significantly change the foam's properties, inasmuch as they react into the system and become part of the foam structure, are not satisfactory solvents for dimethylsilicone oils, since not enough oil can be dissolved to provide foam stabilization at practical solution concentrations. High resilience foams are also adversely affected by dimethylsilicones having more than about ten dimethylsiloxy units per siloxane. For example only five or ten weight per cent of such species in a dimethyl silicone oil can appreciably degrade the foam's physical properties and even cause foam shrinkage.

Moreover, while particularly unique high resilience polyether urethane foam can be prepared employing certain siloxane-oxyalkylene block copolymer surfactants as disclosed in U.S. Patent Application Ser. No. 84,181 filed Oct. 26, 1970, said disclosure does not teach the use of the novel organosilicon surfactants employed in this invention.

SUMMARY OF THE INVENTION

It has been discovered that flexible high resilience polyether urethane foam can be prepared according to the instant invention which involves employing certain novel siloxane copolymer surfactants as more fully defined below.

The siloxane copolymer surfactants employed in this invention have been found to control the cell uniformity of high resilience polyether urethane foam without obtaining tight foam and with little if any foam shrinkage and without causing any severe adverse effects to the foam's physical properties, e.g. the foam's resilience and its resistance towards flammability. Moreover voids in the foam are eliminated or at least greatly reduced by the instant invention and the cell structure of the foam is also much more uniform and finer than where no surfactant agent is employed. This discovery is surprising since as outlined above not all surfactants are suitable for use in the production of high resilience foams. Indeed even siloxane copolymers of the same type employed herein, but outside the scope of the instant invention, were found to cause shrinkage of the foam.

Therefore it is an object of this invention to provide a process for producing high resilience polyether urethane foam. It is further an object of this invention to provide novel organosilicon surfactants for use in said process. It is still another object of this invention to provide novel compositions of said surfactants for use in said process. It is also another object of this invention to provide high resilience polyether urethane foams produced by said process. Other objects and advantages of this invention will become readily apparent from the following description and appended claims.

More particularly this invention is directed, in part, to a process for preparing high resilience polyether urethane foam, said process comprising foaming and reacting a reaction mixture comprising:

(I) An organic polyol selected from the group consisting of (A) a polyether triol containing at least 40 mole percent primary hydroxyl groups and having a molecular weight from about 2,000 to about 8,000 and (B) a mixture of said polyether triol and other polyethers having an average of at least two hydroxyl groups, said polyether triol of said mixture amounting to at least 40 weight percent of the total polyol content;

(II) An organic polyisocyanate, said organic polyol and said polyisocyanate being present in the mixture in a major amount and in the relative amount required to produce the urethane;

(III) A blowing agent in a minor amount sufficient to foam the reaction mixture;

(IV) A catalytic amount of a catalyst for the production of the urethane from the organic polyol and polyisocyanate; and (V) A minor amount of an aralkyl modified siloxane having the average formula $$(X)_zR_{3-z}SiO(R_2SiO)_x[(X)(R)SiO]_ySiR_{3-z}X_z$$

wherein $x$ has a value of 2 to 8 inclusive; $y$ has a value of 0 to 6 inclusive; $z$ has a value of 0 to 1 inclusive; R is a lower alkyl or phenyl radical; and X is an aralkyl radical of the formula

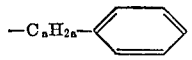

where $a$ has a value of 2 or 3; said siloxane containing at least one of said aralkyl radicals and having a viscosity in the range of about 4 to about 40 centistokes at 25° C.

It is to be understood of course that the above process and the appended claims read on employing a single ingredient of the type specified or any of the various combinations of ingredient mixtures possible. For example, in addition to employing a single ingredient of the types specified, if desired, a mixture of triols, a mixture of polyisocyanates, a mixture of blowing agents, a mixture of catalysts and/or a mixture of siloxane oils can be employed. Likewise the triol-polyether starting mixture could consist of a single triol and a mixture of polyethers, a mixture of triols and a single polyether or a mixture of two or more triols and two or more polyethers.

DESCRIPTION OF THE PREFERRED EMBODIMENTS

As indicated above the aralkyl modified siloxane oils employed as the siloxane polymer surfactant stabilizers in this invention are characterized in part as containing at least two internal dihydrocarbyl siloxy units ($R_2SiO$) and having at least one siloxy unit having at least one aralkyl radical. It is of course to be understood that the individual internal siloxy units can be the same or different and be arranged in any order.

Accordingly the siloxane oils useful as surfactants in this invention contain from 2 to 8 internal dihydrocarbyl siloxy units, such as dimethylsiloxy, diethylsiloxy, dipropylsiloxy, methylethylsiloxy, methylphenylsiloxy groups, and the like. Examples of internal aralkyl siloxy units that can be present in said siloxane oils include, e.g. (phenylethyl) methylsiloxy, (phenylethyl) ethylsiloxy, (phenylpropyl)methylsiloxy groups, and the like. Illustrative end-blocking or chain terminating siloxy units of said siloxane oils are such terminal groups as trimethylsiloxy, triethylsiloxy, (phenylethyl)dimethylsiloxy, (phenylpropyl)dimethylsiloxy groups and the like. Preferably R is a methyl radical. Thus illustrative of the more preferred polymeric siloxane oils employable in the instant invention are trimethyl end-blocked (phenylethyl) methylsiloxy-dimethylsiloxane oils, trimethyl end-blocked (phenylpropyl) methylsiloxy-dimethylsiloxane oils, (phenylethyl)dimethyl end-blocked dimethylsiloxane oils, (phenylpropyl)dimethyl end-blocked dimethylsiloxane oils, trimethyl end-blocked (phenylethyl) methylsiloxy-(phenylpropyl) methylsiloxy dimethylsiloxane oils, and (phenylethyl) dimethyl end-blocked-(phenylethyl) methylsiloxy-dimethylsiloxane oils.

Furthermore it is considered that the above aralkyl modified siloxane oils having a viscosity in the range of about 4 to about 40 centistokes at 25° C. employed as the surfactant stabilizers in this invention are novel compounds, per se. The preferred siloxane oils are those having a viscosity from about 5 to about 20 centistokes at 25° C.

Such siloxane oils can be produced by any number of conventional reactions well known in the art, as disclosed e.g. by U.S. Pat. No. 3,221,040. For instance they can be prepared by the equilibration of corresponding siloxanes using an acid or base catalyst. They can also be prepared by the platinum-catalyzed addition of e.g. styrene or alphamethylstyrene to a hydrosiloxane. In addition they can be prepared by the cohydrolysis and co-condensation of corresponding chlorosiloxanes. It is to be understood, or course, that while the siloxane oils used in this invention can be discrete chemical compounds they are usually mixtures of various discrete siloxane species, due at least in part, to the fact that the starting materials used to produce the siloxane oils are themselves usually mixtures. Thus it is to be also understood that the above formula representing the siloxane oils as used herein also encompasses the possibility of the presence of small amounts of other siloxy units, such as (alpha-phenylethyl) methyl siloxy and methyl(hydrogen)siloxy groups, in the siloxane oils due to an incomplete reaction or the nature of the starting materials used to produce the siloxane oils. The siloxane oils employed herein may be sparged (i.e. stripped of lites) or unsparged.

The amount of active aralkyl modified siloxane oil employed as the foam stabilizer will generally fall within the range of about 0.03 to about 2 parts by weight or greater, per hundred parts by weight of the organic polyol starting material. Generally there is no commensurate advantage to using amounts of siloxane oil greater than about 2 parts by weight, while the use of amounts below 0.03 parts by weight can result in voids in the foam. Preferably the siloxane oils are employed in amounts ranging from about 0.05 to 0.5 parts by weight per 100 parts by weight of the organic polyol starting materials.

The polyhydroxyl reactants (organic polyols) employed in this invention as the starting materials to prepare the polyurethane foams can be any polyether triol containing at least 40 mole percent of primary hydroxyl groups and having a molecular weight from about 2,000 to about 8,000. Conversely said polyether triols can contain no more than 60 mole percent of secondary hydroxyl groups. Preferably said polyether triols contain about 60 to 90 mole percent of primary hydroxyl groups and have a molecular weight from about 4,000 to about 7,000.

The preferred polyether triols of this invention are polyalkyleneether triols obtained by the chemical addition of alkylene oxides to trihydroxyl organic containing materials, such as glycerol; 1,2,6-hexanetriol; 1,1-trimethylolethane; 1,1,1-trimethylolpropane; 3-(2-hydroxyethoxy)-1,2-propanediol; 3-(2-hydroxypropoxy)-1,2-propanediol; 2,4-dimethyl - 2 - (2-hydroxyethoxy)methylpentanediol-1,5; 1,1,1 - tris[(2 - hydroxy - ethoxy)methyl] - ethane; 1,1,1 - tris[(2 - hydroxypropoxy)methyl]-propane; and the like, as well as mixtures thereof.

Alternatively the organic polyol starting materials of this invention can be mixtures consisting essentially of said above defined polyether triols and other polyether polyols having an average of at least two hydroxyl groups, said above defined polyether triols amounting to at least 40 preferably at least 50, weight percent of the total polyol content of the mixtures. Illustrative of such other polyethers are triols outside of the scope defined above, diols, tetraols and polymer/polyols, and the like, as well as mixtures thereof.

Examples of such polyether polyols that can be mixed with the above defined polyether triols include those adducts of alkylene oxide to such polyols as diethylene glycol; dipropylene glycol; pentaerythritol; sorbitol; sucrose; lactose; alpha-methylglucoside; alpha-hydroxylalkylglucoside; novolac resins; water; ethylene glycol; propylene glycol; trimethylene glycol; 1,2-butylene glycol; 1,3-butanediol; 1,4-butanediol; 1,5-pentanediol; 1,2-hexane glycol; 1,10-decanediol; 1,2-cyclohexanediol; 2-butene-1,4-diol; 3-cyclohexene-1,1-dimethanol; 4-methyl-3-cyclohexene-1,1-dimethanol; 3-methylene-1,5-pentanediol; (2-hydroxyethoxy) - 1 - propanol; 4-(2-hydroxyethoxy)-1-butanol; 5-(2-hydroxypropoxy)-2-octanol; 3-allyloxy-1,5-pentanediol; 2-allyloxymethyl - 2 - methyl-1,3-propanediol; [4,4-pentyloxymethyl] - 1,3 - propane-diol; 3-(o-propenyl-phenoxy)-1,2-propanediol; 2,2 - diisopropylidenebis-p-phenyleneoxy)-diethanol; and the like, or phosphoric acid; benzenephosphoric acid; polyphosphoric acids such as tripolyphosphoric acid and tetrapolyphosphoric acid; and the like; as well as mixtures thereof.

Another type of polyether polyol that can be mixed with the above defined polyether triols and used as the starting materials of this invention are graft polymer/polyether compositions obtained by polymerizing ethylenically unsaturated monomers in a polyether as described in British Pat. No. 1,063,222 and U.S. Pat. No. 3,383,351, the disclosures of which are incorporated herein by reference thereto. Suitable monomers for producing such compositions include, for example, acrylonitrile, vinyl chloride, styrene, butadiene, vinylidine chloride, and the like. Suitable polyethers for producing such compositions include, for example those polyethers hereinabove-described. These graft polymer/polyether compositions can contain from about 1 to about 70 weight percent, preferably about 5 to about 50 weight percent and most preferably about 10 to about 40 weight percent of the monomer polymerized in the polyether. Such compositions are conveniently prepared by polymerizing the monomers in the selected polyether at a temperature of 40° to 150° C. in the presence of a free radical polymerization catalyst, such as peroxides, persulfates, percarbonates, perborates and azo compounds as more fully described by the above patent references. The resulting compositions may contain a small amount of unreacted polyether, monomer and free polymer as well as the graft polymer/polyether complex. Especially preferred are the graft polymer/polyethers obtained from acrylonitrile and polyether triols.

The alkylene oxides employed in producing the preferred polyethers described above normally have from 2 to 4 carbon atoms, inclusive while propylene oxide and mixtures of propylene oxide and ethylene oxide are especially preferred.

The exact organic polyol or polyols employed as the starting materials of this invention merely depend on the end use of the high resilience polyether urethane foam. For instance, the employment of polyether triols having at least 40 mole percent primary hydroxyl groups and molecular weights from 2,000 to 8,000 preferably 4,000 to 7,000 generally have hydroxyl numbers from 84 to 21, preferably 42 to 28 and give primarily flexible polyether foams. The supplementary polyethers which may have any proportion of primary to secondary hydroxyl groups and which may be mixed with the required polyether triols can be used to control the degree of softness of the foam or vary the load bearing properties of the foam. Such limits are not intended to be restrictive, but are merely illustrative of the large number of possible combinations of polyether triols and other polyethers that can be employed.

The hydroxyl number is defined as the number of milligrams of potassium hydroxide required for the complete neutralization of the hydrolysis product of the fully acetylated derivative prepared from 1 gram of polyol or mixtures of polyols with or without other crosslinking additives used in the invention. The hydroxyl number can also be defined by the equation:

$$OH = \frac{56.1 \times 1000 \times f}{m.w.}$$

wherein OH=hydroxyl number of the polyol.

A variety of organic isocyanates can be employed in the foam formulations of this invention for reaction with the organic polyol starting materials above described to provide high resilience polyether urethane foams. Preferred isocyanates are polyisocyanates and polyisothiocyanates of the general formula:

$$(QNCY)_i$$

wherein Y is oxygen or sulfur, $i$ is an integer of two or more and Q is an organic radical having the valence of $i$. For instance, Q can be a substituted or unsubstituted hydrocarbon radical, such as alkylene and arylene, having one or more aryl-NCY bonds and/or one or more alkyl-NCY bonds. Q can also include radicals such as —QZQ—, where Q is an alkylene or arylene group and Z is a divalent moiety such as —O—, —O—Q—O—, —CO—, $CO_2$, —S—, —S—Q—S—, —$SO_2$— and the like. Examples of such compounds include hexamethyl diisocyanate, 1,8-diisocyanato-p-methane, xylylene diisocyanate, $(OCNCH_2CH_2CH_2OCH_2)_2O$, 1-methyl-2,4-diisocyanatocyclohexane, phenylene diisocyanates, tolylene di- isocyanates, chlorophenylene diisocyanates, diphenylmethane-4,4'-diisocyanate, naphthalene-1,5 - diisocyanate, triphenylmethane-4,4'-4''-triisocyanate, and isopropylbenzene-alpha-4-diisocyanate.

Further included among the isocyanates useful in this invention are dimers and trimers of isocyanates and diisocyanates and polymeric diisocyanates such as those having the general formula:

$$(QNCY)_i \text{ and } [Q(NCY)_i]_j$$

in which $i$ and $j$ are integers of two or more, and/or (as additional components in the reaction mixtures) compounds of the general formula:

$$L(NCO)_i$$

in which $i$ is one or more and L is a monofunctional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; compounds containing a ≡Si—NCO group, isocyanates derived from sulfonamides $(QSO_2NCO)$, cyanic acid, thiocyanic acid, and compounds containing a metal —NCO radical such as tributyltinisocyanate.

More specifically, the polyisocyanate component employed in the polyurethane foams of this invention also includes the following specific compounds as well as mixtures of two or more of them: 2,4-tolylene diisocyanate, 2,6-tolylene diisocyanate, crude tolylene diisocyanate, bis-(4-isocyanatophenyl)methane, polymethylene polyphenylisocyanates that are produced by phosgenation of aniline-formaldehyde condensation products, dianisidine diisocyanate, toluidine diisocyanate, xylylene diisocyanate, bis(2-isocyanatoethyl)-fumarate, bis(2-isocyanatoethyl)carbonate, 1,6-hexamethylene-diisocyanate, 1,4 - tetramethylene-diisocyanate, 1,10 - deca-methylene-diisocyanate, cumene-2,4-diisocyanate, 4 - methoxy-1,3-phenylene diisocyanate, 4-chloro-1,3-phenylenediisocyanate, 4 - bromo-1,3-phenylene diisocyanate, 4-ethoxy - 1,3 - phenylene-diisocyanate, 2,4'-diisocyanata-diphenylether, 5,6 - dimethyl-1,3-phenylene diisocyanate, 2,4-dimethyl-1,3-phenylenediisocyanate, 4,4'-diisocyanatodiphenylether, bis 5,6-(2 - iso - cyanato-ethyl)bicyclo [2.2.1]hept-2 - ene, benzidinediisocyanate, 4,6-dimethyl-1,3-phenylenediisocyanate, 9,10-anthracene-diisocyanate, 4,4'-diisocyanatodibenzyl, 3,3-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5 - fluorenediisocyanate, 1,8-naphthalenediisocyanate, 2,6 - diisocyanatobenz-furan, 2,4,6-toluenetriisocyanate, and many other organic polyisocyanates that are known in the art, such as those that are disclosed in an article by Siefken, Ann., 565, 75 (1949). In general, the aromatic polyisocyanates are preferred.

Particularly useful isocyanate components of high resilience cold cure formulations within the scope of this invention are combinations of isomeric tolylene diisocyanates and polymeric isocyanates having units of the formula

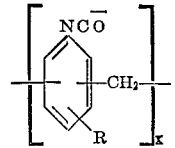

wherein R is hydrogen and/or lower alkyl and $x$ has a value of at least 2.1. Preferably the lower alkyl radical is methyl and $x$ has a value of from 2.1 to about 3.0.

The amount of polyisocyanate employed will vary slightly depending on the nature of the polyurethane being prepared. In general the polyisocyanates are employed in the foam formulations of this invention in amounts that provide from 80 to 150 percent, preferably from 90 to 110 percent of the stoichiometric amount of the isocyanato groups required to react with all of the hydroxyl groups of the organic polyol starting materials and with any water present as a blowing agent. Most preferably, a slight amount of isocyanato groups in excess to the stoichiometric amount is employed.

The blowing agents employed in this invention include methylene chloride, water, liquefied gases which have boiling points below 80° F. and above −60° F., or by other inert gases such as nitrogen, carbon dioxide, methane, helium and argon. Suitable liquefied gases include saturated aliphatic fluorohydrocarbons which vaporize at or below the temperature of the foaming mass. Such gases are at least partially fluorinated and can also be otherwise halogenated. Fluorocarbon blowing agents suitable for use in foaming the formulations of this invention include trichloromonofluoromethane, dichlorodifluoromethane, dichlorofluoromethane, 1,1-chloro-1-fluoroethane, 1-chloro-1,1-difluoro, 2,2-dichloroethane, and 1,1,1-trifluoro, 2-chloro-2-fluoro, 3,3-difluoro-4,4,4-trifluorobutane. The amount of blowing agent used will vary with density desired in the foamed product. Usually from 2 to 20 parts by weight of the blowing agent per 100 parts by weight of the organic polyol starting materials are preferred.

The catalysts employed in this invention include any of the catalyst employed in producing conventional flexible polyurethane foam. Illustrative catalysts are conventional amine catalysts such as N-methyl morpholine, N-ethyl morpholine, hexadecyl dimethylamine, triethylamine, N,N,N',N' - tetramethyl - 1,3 - butanediamine, N,N-dimethylethanolamine, bis(2 - dimethylaminoethyl)ether, N,N,N',N' - tetramethylethylenediamine, 4,4' - methylene bis(2 - chloroaniline), dimethyl benzylamine, N - coco morpholine, triethylene diamine, [1,4 - diazobicyclo (2,2,2)-octane], the formate salts or triethylene diamine, other salts of triethylene diamine and oxyalkylene adducts of primary and secondary amino groups, and the like. If desired, conventional organo metal catalysts may be used to supplement the amine catalysts. Illustrative of such metal catalysts are the tin salts of various carboxylic acids e.g. stannous octoate, dibutyl tin dilaurate, nickel acetylacetonates, and the like. Generally the total amount of catalyst employed in the mixtures will range from 0.1 to 0.5 or 2 weight percent based on the total weight of the organic polyol starting materials.

The relative amounts of the various components reacted in accordance with the above described process for producing high resilience polyether urethane foams in accordance with this invention are not narrowly critical. The polyether and the polyisocyanate are present in the foam formulations used to produce such foams in major amount. The relative amounts of these two components is the amount required to produce the urethane structure of the foam and such relative amounts are well known in the art. The blowing agent, catalyst and surfactants are each present in a minor amount necessary to achieve the function of the component. Thus, the blowing agent is present in a minor amount sufficient to foam the reaction mixture, the catalyst is present in a catalytic amount (i.e., an amount sufficient to catalyze the reaction to produce the urethane at a reasonable rate) and the siloxane oil surfactants are present in a foam-stabilizing amount (i.e. in an amount sufficient to stabilize the foam). Preferred amounts of these various components are given hereinabove.

The high resilience cold cure urethane foams produced in accordance with this invention can be used for the same purposes as corresponding conventional hot cure polyether urethane foams, e.g. they can be used wherever cushioning is desired, e.g. in furniture; in transportation systems, automobiles, planes, etc.; in carpeting; in the packaging of delicate objects; and the like.

Other additional ingredients can be employed in minor amounts in producing the high resilience polyether urethane foams in accordance with the process of this invention, if desired, for specific purposes. Thus inhibitors (e.g. d-tartaric acid and tertiary-butyl pyrocatechol, "Ionol") can be employed to reduce any tendency of the foam to hydrolytic or oxidative instability. Flame retardants (e.g. tris(2 - chloroethyl)phosphate) can be used. Dihydrocarbon silicone oils, e.g. dimethylsiloxane and the siloxane-oxyalkylene block copolymers described in U.S. Application No. 84,181 filed Oct. 26, 1970 now U.S. Pat. 3,741,-917 may be mixed if desired with the siloxane oils employed in this invention. While such mixtures are not required they may help expand the usefulness of the siloxane oils employed herein by broadening the siloxane oil concentration range, providing more processing latitude and increasing the adaptability of the siloxane oil to a variety of foam formulations. Of course any organic solvent for the amine catalysts, e.g. polyols such as hexylene glycol (i.e. 2 - methyl - 2,4 - pentanediol), diproylene glycol, and the like can be used which substantially do not adversely affect the operation of the process or reactants. Examples of other additives that can be employed are crosslinkers such as glycerol, triethanol amine, and their oxyalkylene adducts, and anti-yellowing agents.

An additional feature of the instant invention are the novel compositions suitable for use in producing the high resilience polyether urethane foam. For example it may be desirable, particularly on a commercial scale to employ the siloxane oil in a diluted form, i.e. in the form of a siloxane oil-solvent solution premix or a siloxane oil-solvent-catalyst solution premix. Such solution premixtures can help serve to eliminate any mixing, metering, or oil settling problems. Moreover, fewer streams of ingredients may be needed at the mixing head of the operational apparatus. Of considerable importance is that the formulator has the latitude to select the particular solvent which best suits the system and minimize or eliminate any loss of foam properties. Siloxane oil-solvent-catalyst premixes can also be used since the selected solvent can be one which serves the dual role of solvent for the catalysts as well as the siloxane oil. This option of formulating a premix simplifies the foaming operation and improves the precision of metering ingredients. While any suitable organic solvent such as hydrocarbon, halo-hydrocarbons, organic hydroxyl compounds, alkyl phthalates, and the like may be employed, preferably when employed the solvent selected should be one in which the aralkyl modified siloxane oil is substantially soluble. For example, it is preferred that at least five parts by weight of the aralkyl modified siloxane oil be soluble in 95 parts by weight of solvent. More preferably the minimum percentage of aralkyl modified siloxane oil in the siloxane oil-solvent or siloxane oil-solvent-catalyst solutions should be in the range of at least about ten to at least about 20 weight percent. Of course it is understood that such solvents need not be employed and that the maximum percentage of aralkyl modified siloxane oil in said solvent solutions is not critical. Moreover, when employed such solvent solutions should of course be correlated to the amounts of active aralkyl modified siloxane oil that may be employed per hundred parts by weight of the organic polyol starting material as outlined above. The same correlation should also be made with regard to catalyst when a siloxane oil-solvent-catalyst solution is employed. Preferably the solvent for the aralkyl modified siloxane oil is an organic hydroxyl compound such as hydroxyl terminated organic ether compounds. More preferably they are polyether triols, diols, and monools such as the adducts of ethylene oxide, propylene oxide, butylene oxide, with starters such as glycerol, water, trimethylolpropane, 1,2,6-hexanetriol, ethylene glycol, butanol, nonylphenol, and the like. Of course the oxyalkylene units of such adducts may be of different types, e.g. oxypropylene and oxyethylene groups, and may be randomly distributed or in blocks. The most preferred solvents are the polyether triols having all or predominantly oxypropylene units in the oxyalkylene portion and having molecular weights in the range from about 2,000 to 6,000 inasmuch as they may be the same, as or similar to the primary triols employed as the organic polyol starting material of the foam formulation. Moreover this discovery concerning the solubility of the aralkyl modified siloxane oils of this invention can be regulated and controlled, e.g. at relatively low molecular weights of these oils, where viscosities are of the order of about ten centistokes or less, the moles of dimethylsiloxy units can substantially exceed the number of moles of aralkylmethylsiloxy units, inasmuch as the low average molecular weight makes a contribution towards solubilization. At higher molecular weights, e.g. at viscosities of 30 centistokes or higher, a greater proportion of aralkylmethylsiloxy units, then used for low molecular weight oils, may be necessary to achieve satisfactory solubility.

In accordance with this invention, the cold cure polyether urethane foams can be produced by any suitable technique. The preferred process is a one-step or one shot technique wherein all of the reactants are reacted simultaneously with the foaming operation. A second general process is called the prepolymer process whereby a prepolymer is formed by reacting the polyether starting material with a small excess of the isocyanate and later foaming the prepolymer by the reaction with water or an inert blowing agent. Another method which can be used is the quasi-prepolymer technique which involves reacting a large excess of the isocyanate with the polyether starting material and then subsequently foaming this product with additional polyether in the presence of a blowing agent. Sometimes it is preferred to premix the polyether starting material and siloxane oil stabilizer although any suitable premixture of the various ingredients can be used, e.g. a siloxane oil-solvent-catalyst solution as outlined above. Of course it is understood that the ingredients of the foam forming formulation can be mixed in any suitable manner prior to commencing the cure reaction. Because of the high exothermic nature of the reaction high resilience urethane foams are rapidly produced without the need of any external heat by mixing the reactants at ambient temperatures and pouring the foaming reaction mixture into a suitable mold and allowing the foam to cure itself. Of course, if desired the overall reaction can be even further accelerated by preheating the mold and or employing conventional high temperature post curing procedures. Within a shorter period of time the cold cure process, with or without post cure, simultaneously achieves a greater degree of cure throughout the entire foam, and shorter tack free and demolding time, then is generally achieved with conventional hot cure processes. For instance, cold cure foams can be removed from the mold far sooner without substantial damage to the surface than conventional hot cure foams. Of course it is to be understood that the high resilience polyether urethane foams of this invention can also be prepared in slabstock form, if desired.

The following examples illustrate the present invention and are not to be regarded as limitative. It is to be understood that "Me" represents a methyl radical, "Conc." represents concentration, "p.h.p." refers to parts of active siloxane block copolymer per hundred parts of organic polyol starting material "cstk. 25° C." represents the centistoke viscosity measured at 25° C., "100 Index" indicates that the number of moles of NCO groups is equal to the total moles of hydroxyl groups in the foam formulation, and that all of the parts, percentages and proportions referred to herein and in the appended claims are by weight unless otherwise indicated.

EXAMPLE 1

Into a flask equipped with a condenser, stirrer and thermometer where charged about 81 grams (0.50 mole) of hexamethyldisiloxane and about 318 grams of a phenylethylmethylsiloxane-methylsiloxane hydrolyzate having a viscosity of about 400 centistokes at 25° C. and consisting of about 4.9 grams (0.029 mole) of trimethylsiloxy end-blocker, about 164 grams (1.0 mole) of phenethylmethylsiloxy groups and about 149 grams (2.0 mole) of dimethylsiloxy groups. The mixture was then equilibrated under a nitrogen blanket by adding about 0.7 grams (70 drops) of trifluoromethane sulfonic acid catalyst and stirring for about 2 hours at 85° C. The equilibrate was neutralized with sodium bicarbonate and filtered. There was obtained a colorless phenylethyl-modified siloxane oil product having a viscosity of about 11 centistokes at 25° C. Said product siloxane is hereinafter referred to as Siloxane I and its average composition and formula are given in Tables 1 and 2 below.

EXAMPLE 2

Example 1 was repeated using about 49.2 grams of hexamethyldisiloxane and about 150.8 grams of the phenylethylmethylsiloxane - methylsiloxane hydrolyzate. There was obtained a colorless phenylethyl-modified siloxane oil product having a viscosity of about 8 centistokes at 25° C. Said product siloxane is hereinafter referred to as Siloxane II and its average composition and formula are given in Tables 1 and 2 below.

EXAMPLE 3

Example 1 was repeated using about 157 grams of hexamethyldisiloxane, about 343 grams of the phenylethylmethylsiloxane-methylsiloxane hydrolyzate, about 0.2 grams (20 drops) of the trifluoromethane sulfonic acid catalyst and the reaction maintained at 70–80° C. for about 2½ hours. The neutralized, filtered siloxane was sparged with nitrogen at 160° C. for about 2 hours and about 98 cc.'s of lites recovered. About 330 grams of a colorless phenylethyl-modified siloxane oil product having a viscosity of about 13 centistokes at 25° C. was obtained. Said product siloxane is hereinafter referred to as Siloxane III and its average composition and formula before sparging are given in Tables 1 and 2 below.

EXAMPLE 4

Example 3 was repeated using about 77 grams of hexamethyldisiloxane, about 298 grams of the phenylethylmethylsiloxane-methylsiloxane hydrolyzate, along with sparging the neutralized, filtered siloxane at 160° C. for about 2–3 hours. There was obtained a colorless phenylethyl-modified siloxane oil product having a viscosity of about 18 centistokes at 25° C. Said product siloxane is hereinafter referred to as Siloxane IV and its average composition and formula before sparging are given in Tables 1 and 2 below.

EXAMPLE 5

Example 3 was repeated using about 75 grams of hexamethyldisiloxane, about 298 grams of the phenylethylmethylsiloxane-methylsiloxane hydrolyzate, about 0.45 grams (45 drops) of the trifluoromethane sulfonic acid catalyst, along with sparging the neutralized, filtered siloxane at 160° C. for about 3 hours. There was obtained a colorless phenylethyl-modified siloxane oil product having a viscosity of about 27 centistokes at 25° C. Said product siloxane is hereinafter referred to as Siloxane V and its average composition and formula before sparging are given in Tables 1 and 2 below.

EXAMPLE 6

A mixture of about 41.9 grams of a

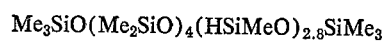

siloxane having a viscosity of about 3.5 centistokes at 25° C., about 33.1 grams of alpha-methylstyrene and about 0.038 grams of Ionol, an inhibitor was prepared and heated to 70° C. Then about 7 drops of a solution consisting of 3 parts by weight of $H_2PtCl_6 \cdot 6H_2O$, 15 parts by weight of ethanol and 82 parts by weight of glycidyl glycol dimethylether was added so as to furnish about 25 parts of platinum per million parts of the reactants employed. An exotherm to 115° C. was observed and the reaction maintained at about 95° C. until completed. The siloxane was then neutralized with sodium bicarbonate, sparged with nitrogen at 130° C. (about 11 cc.'s of lites were recovered) and filtered. There was obtained a colorless phenylisopropyl-modified siloxane oil product having a viscosity of about 35 centistokes at 25° C. Said product siloxane is hereinafter referred to as Siloxane VI and its average composition and formula before sparging are given in Tables 1 and 2 below.

EXAMPLE 7

Example 1 was repeated using about 25.4 grams of hexamethyldisiloxane, about 51 grams of the phenylethylmethylsiloxane-methylsiloxane hydrolyzate, about 23.6 grams of a mixture of tri and tetra dimethylcyclic siloxane, and about 0.09 grams (9 drops) of the trifluoromethane sulfonic acid catalyst. There was obtained a colorless phenylethyl-modified siloxane oil product having a viscosity of about 7 centistokes at 25° C. Said product siloxane is hereinafter referred to as Siloxane VII and its average composition and formula are given in Tables 1 and 2 below.

EXAMPLE 8

Example 1 was repeated using about 4.4 grams of hexamethyldisiloxane, about 7.3 grams of tetracyclic phenylisopropyl(methyl) siloxane, about 33.3 grams of the phenylethylmethylsiloxane - methylsiloxane hydrolyzate, about 0.05 grams (5 drops) of the trifluoromethane sulfonic acid catalyst and the reaction maintained at 80–85° C. for about 2 hours. There was obtained a colorless phenyl isopropyl-modified phenylethyl-modified siloxane oil product having a viscosity of about 36 centistokes at 25° C. Said product siloxane is hereinafter referred to as Siloxane VIII and its average composition and formula are given in Tables 1 and 2 below.

EXAMPLE 9

A mixture of about 30.1 grams of a $$Me_2HSiO(Me_2SiO)_4SiMe_2H$$

sloxane, about 19.9 grams of alpha-methylstyrene, about 0.05 grams of Ionol, one drop of acetic acid and about 9 drops of a solution consisting of 3 parts by weight of $H_2PtCl_6 \cdot 6H_2O$, 15 parts by weight of ethanol and 82 parts by weight of glycidyl glycol dimethylether so as to furnish about 50 parts of platinum per million parts of the reactants employed was prepared and heated to 110° C. and maintained until the reaction was completed. Then the siloxane was neutralized with sodium bicarbonate, cooled and filtered. There was obtained a colorless phenylisopropyl-modified siloxane oil product having a viscosity of about 7 centistokes at 25° C. Said product siloxane is hereinafter referred to as Siloxane IX and its average composition and formula are given in Tables 1 and 2 below.

EXAMPLE 10

Example 9 was repeated using about 27 grams of a $Me_2HSiO(Me_2SiO)_3SiMe_2H$ siloxane and about 22.2 grams of alphamethylstyrene. There was obtained a colorless phenylisopropyl-modified siloxane oil product having a viscosity of about 6 centistokes at 25° C. Said product siloxane is hereinafter referred to as Siloxane X and its average composition and formula are given in Tables 1 and 2 below.

EXAMPLE 11

Example 1 was repeated using about 73.1 grams of hexamethyldisiloxane, about 126.9 grams of the phenylethylmethylsiloxanemethylsiloxane hydrolyzate and about 0.25 grams (25 drops) of the trifluoromethane catalyst. There was obtained a colorless phenylethyl-modified siloxane oil product having a viscosity of about 4.2 centistokes at 25° C. Said siloxane product is hereinafter referred to as Siloxane XI and its average composition and formula are given in Tables 1 and 2 below.

Siloxanes I to XI were compared with five other siloxane oils, hereinafter referred to as Siloxanes A to E, the average composition and formula of distilled Siloxane A, as well as the average compositions and formulas of Siloxanes B to E before sparging also being reported in Tables 1 and 2 below.

TABLE 1.—AVERAGE COMPOSITIONS OF ARALKYL MODIFIED SILOXANE OILS

| Siloxane | R | z | x | y | a | Viscosity (cs. 25° C.) |
|---|---|---|---|---|---|---|
| I | Me | 0 | 3.8 | 1.9 | 2 | 11 |
| II | Me | 0 | 3.0 | 1.5 | 2 | 8 |
| III | Me | 0 | 2.2 | 1.1 | 2 | 13 |
| IV | Me | 0 | 3.8 | 1.9 | 2 | 18 |
| V | Me | 0 | 5.4 | 2.7 | 2 | 27 |
| VI | Me | 0 | 4.0 | 2.8 | 3 | 35 |
| VII | Me | 0 | 4.0 | 1.0 | 2 | 7 |
| VIII | Me | 0 | 7.0 | 4.9 | 2–3 | 36 |
| IX | Me | 1 | 4.0 | 0 | 3 | 7 |
| X | Me | 1 | 3.0 | 0 | 3 | 6 |
| XI | Me | 0 | 1.8 | 0.9 | 2 | 4.2 |
| C | Me | 0 | 15.2 | 7.4 | 2 | 57 |
| D | Me | 0 | 13.7 | 5.0 | 2 | 44 |
| E | Me | 0 | 8.7 | 4.2 | 2 | 47 |
| Average composition of dimethyl siloxane oils | | | | | | |
| A | Me | 0 | 8 | 0 | 0 | 5 |
| B | Me | 0 | 11 | 0 | 0 | 7 |

Siloxanes I to XI are useful in this invention.
Siloxanes A to E are not useful in this invention.

TABLE 2.—AVERAGE FORMULA FOR ARALKYL-MODIFIED SILOXANE OILS

| Siloxane | |
|---|---|
| I | $Me_3SiO(Me_2SiO)_{3.8}\left[\left(\bigcirc\right)-C_2H_4-\right)(Me)SiO\Big]_{1.9}SiMe_3$ |
| II | $Me_3SiO(Me_2SiO)_{3.0}\left[\left(\bigcirc\right)-C_2H_4-\right)(Me)SiO\Big]_{1.5}SiMe_3$ |
| III | $Me_3SiO(Me_2SiO)_{2.2}\left[\left(\bigcirc\right)-C_2H_4-\right)(Me)SiO\Big]_{1.1}SiMe_3$ |
| IV | $Me_3SiO(Me_2SiO)_{3.0}\left[\left(\bigcirc\right)-C_2H_4-\right)(Me)SiO\Big]_{1.9}SiMe_3$ |
| V | $Me_3SiO(Me_2SiO)_{5.4}\left[\left(\bigcirc\right)-C_2H_4-\right)(Me)SiO\Big]_{2.7}SiMe_3$ |
| VI | $Me_3SiO(Me_2SiO)_{4.0}\left[\left(\bigcirc\right)-CHMeCH_2-\right)(Me)SiO\Big]_{2.8}SiMe_3$ |
| VII | $Me_3SiO(Me_2SiO)_{4.0}\left[\left(\bigcirc\right)-C_2H_4-\right)(Me)SiO\Big]_{1.0}SiMe_3$ |

TABLE 2—Continued

Siloxane

VIII  $Me_3SiO(Me_2SiO)_{7.0}\left[\left(\langle\bigcirc\rangle-C_2H_4-\right)(Me)SiO\right]_{3.5}$ $\left[\left(\langle\bigcirc\rangle-CHMeCH_2-\right)(Me)SiO\right]_{1.4}SiMe_3$ IX  $\left(\langle\bigcirc\rangle-CHMeCH_2-\right)Me_2SiO(Me_2SiO)_{4.0}SiMe_2\left(-CH_2MeCH-\langle\bigcirc\rangle\right)$ X  $\left(\langle\bigcirc\rangle-CHMeCH_2\right)Me_2SiO(Me_2SiO)_{3.0}SiMe_2\left(-CH_2MeCH-\langle\bigcirc\rangle\right)$ XI  $Me_3SiO(Me_2SiO)_{1.8}\left[\left(\langle\bigcirc\rangle-C_2H_4-\right)(Me)SiO\right]_{0.9}SiMe_3$ C  $Me_3SiO(Me_2SiO)_{15.2}\left[\left(\langle\bigcirc\rangle-C_2H_4-\right)(Me)SiO\right]_{7.4}SiMe_3$ D  $Me_3SiO(Me_2SiO)_{13.7}\left[\left(\langle\bigcirc\rangle-C_2H_4-\right)(Me)SiO\right]_{5.0}SiMe_3$ E  $Me_3SiO(Me_2SiO)_{8.7}\left[\left(\langle\bigcirc\rangle-C_2H_4\right)(Me)SiO\right]_{4.2}SiMe_3$ Average formula for dimethyl siloxane oils A  $Me_3SiO(Me_2SiO)_6SiMe_3$ to $Me_3SiO(Me_2SiO)_{10}SiMe_3$, inclusive.
B  $Me_3SiO(Me_2SiO)_6SiMe_3$ to $Me_3SiO(Me_2SiO)_{16}SiMe_3$, inclusive.

For the sake of brevity the above designations Siloxanes I to XI and A to E along with the following designations are used to denote the various ingredients employed in the following examples.

TABLE 3

| Designation | Composition |
|---|---|
| Organic polyols: | |
| E1 | This is a polyether triol, mol. wt. about 6,000; hydroxyl No. about 27; containing about 85 mole percent primary hydroxyl groups produced by reacting about 89% propylene oxide and about 11% ethylene oxide with glycerol. |
| E2 | This is a polyether triol, mol. wt. about 5,000; hydroxyl No. about 34; containing about 75 mole percent primary hydroxyl groups produced by reacting about 84% propylene oxide and about 16% ethylene oxide with glycerol. |
| E3 | This is a graft polymer/polyol; about 80 wt. percent polyol, 10 wt. percent styrene and 10 wt. percent acrylonitrile; having a hydroxyl No. of about 28, produced by polymerizing styrene and acrylonitrile in E2. |
| Polyisocyanates: | |
| C1 | This is a mixture of about 80 wt. percent 2,4-tolylene diisocyanate and about 20 wt. percent 2,6-toluene diisocyanate. |
| C2 | This is a polymethylene polyphenyl isocyanate polymer containing about 2.6–2.9 moles of NCO per mole of polymer and having an isocyanate content of about 31.4%. |
| C3 | This is a composition of about 80 wt. percent C1 and about 20 wt. percent C2. |
| C4 | This is a blend of 1 part by wt. of C1 and 1 part by wt. of the isocyanate polymeric residue having an amine equivalent No. of about 106, of the production of C1. |
| Catalyst: | |
| A1 | This is a composition consisting of about 70 wt. percent bis (N,N-dimethylaminoethyl) ether and about 30 wt. percent dipropylene glycol solvent. |
| A2 | This is a composition consisting of about 33 wt. percent triethylenediamine and about 67 wt. percent dipropylene glycol solvent. |
| Siloxane oil solvents: | |
| S1 | This is a polyether triol, mol. wt. about 3700; hydroxyl No. about 46, containing about 0–5 mole percent primary hydroxyl groups and having some internal oxyethylene units, produced by reacting 14% ethylene oxide and 86% propylene oxide with glycerol. |
| S2 | This is a polyether triol, mol. wt. about 3,000 produced by reacting propylene oxide with glycerol. |
| S3 | Polyether triol E2. |

EXAMPLE 12

The foam formulations employed in producing the foams in this example were identical save for variations in the amount of active aralkyl modified siloxane oil employed. The high resilience polyether urethane foams were prepared by adding the final mixture of foam forming ingredients to an uncovered mold and allowing the formulations to cure. Thereafter the foam containing mold was placed in an oven at 125° C. for about 2 minutes to facilitate separation of the paper liner from the mold. Said formulations contained 100 parts by weight of organic polyols on the order of about 50 parts of polyether triol E1 and about 50 parts of polyether triol E3; about 2.8 parts by weight of water; about 0.08 parts by weight of amine catalyst A1; about 0.8 parts by weight of N-ethylmorpholine catalyst; about 0.08 parts by weight of solid triethylene diamine catalyst; about 0.015 parts by weight of dibutyltindilaurate catalyst and about 34.9 parts by weight of polyisocyanate C3 (100 Index). The aralkyl modified siloxane oil was used in the form of a siloxane oil-solvent solution composed of about 90 parts by weight of solvent S1 and about 10 parts by weight of siloxane oil, Siloxane I. The active amount of siloxane oil used was varied and the results are reported in the following table.

TABLE 4

| Foam No. | Siloxane oil | Active siloxane conc. (p.h.p.) | Cells per inch | Shrinkage | Cell uniformity |
|---|---|---|---|---|---|
| 1 | None (control) | | 10 | None | Severe voids—irregular. |
| 2 | Siloxane I | 0.15 | 45 | ...do | Uniform—No voids. |
| 3 | ...do | 0.10 | 41 | ...do | Do. |
| 4 | ...do | 0.075 | 35 | ...do | Do. |
| 5 | ...do | 0.05 | 31 | ...do | Do. |

EXAMPLE 13

Another series of high resilience polyether urethane foams was produced in the same manner as Example 12 using the same foam formulation except that Siloxane II was substituted for Siloxane I in the solvent solution. The results are reported in the following table.

TABLE 5

| Foam No. | Siloxane oil | Active siloxane conc. (p.h.p.) | Cells per inch | Shrinkage | Cell uniformity |
|---|---|---|---|---|---|
| 1 | None (control) | | 10 | None | Severe voids—irregular. |
| 2 | Siloxane II | 0.2 | 40 | ...do | Uniform—no voids. |
| 3 | ...do | 0.15 | 37 | ...do | Do. |
| 4 | ...do | 0.10 | 34 | ...do | Do. |

EXAMPLE 14

High resilience polyether urethane foams were produced in the same manner as Example 12, using formulations containing 100 parts by weight of polyether triol E2; about 3.2 parts by weight of water; about 7.0 parts by weight of triethanolamine; about 1.5 parts by weight of amine catalyst A2; about 53.1 parts by weight of polyisocyanate C4 (100 Index). The siloxane oil employed was not used in the form of a solvent solution; the solvent for the siloxane oil being omitted. The siloxane oil employed and the results obtained are reported in the following table.

TABLE 6

| Foam No. | Siloxane oil | Active siloxane conc. (p.h.p.) | Cells per inch | Shrinkage | Cell uniformity |
|---|---|---|---|---|---|
| 1 | None (control). | | 22 | None | Severe voids—irregular. |
| 2 | Siloxane III | 0.30 | 42 | ...do | Uniform—no voids. |
| 3 | Siloxane V | 0.17 | 52 | ...do | Do. |

EXAMPLE 15

A series of comparative high resilience polyether urethane foams was produced in the same manner as Example 12, using the same foam formulation, except that the siloxane oils employed were not used in the form of solvent solution, the solvent for the siloxane oil being omitted. The amount and nature of the siloxane oil was varied as reported in the following table.

TABLE 7

| Foam No. | Siloxane oil | Siloxane viscosity (cs. 25° C.) | Active siloxane conc. (p.h.p.) | Cells per inch | Shrinkage | Cell uniformity |
|---|---|---|---|---|---|---|
| 1 | None (control) | | | 10 | None | Severe voids—irregular. |
| | *Siloxane oils for this invention* | | | | | |
| 2 | Siloxane I | 11 | 0.1 | 41 | ...do | Uniform—no voids. |
| 3 | Siloxane II | 8 | 0.1 | 34 | ...do | Do. |
| 4 | Siloxane III | 13 | 0.1 | 34 | ...do | Do. |
| 5 | Siloxane IV | 18 | 0.1 | 45 | ...do | Do. |
| 6 | Siloxane V | 27 | 0.075 | 45 | ...do | Do. |
| 7 | Siloxane VI | 35 | 0.04 | 38 | ...do | Do. |
| 8 | Siloxane XI | 4.2 | 0.1 | 25 | ...do | Do. |
| | *Siloxane oils not of this invention* | | | | | |
| 9 | Siloxane B | 7 | 0.05 | 35 | Moderate—no voids | |
| 10 | do | 7 | 0.10 | 46 | Moderate—no voids | |
| 11 | Siloxane C | 57 | 0.05 | (*) | Severe | |
| 12 | Siloxane D | 44 | 0.05 | (*) | Severe | |
| 13 | Siloxane E | 47 | 0.05 | 42 | Moderate—no voids | |

*Too much shrinkage for cell count.

EXAMPLE 16

A series of comparative siloxane oil-organic solvent solutions were prepared by blending various amounts of siloxane oil in polyether solvent S2 to determine the solubility of the siloxane oil. The results are reported in the following table.

TABLE 8

| Siloxane oil | Solvent solution | | Appearance of blend | Siloxane viscosity (cs. 25° C.) |
|---|---|---|---|---|
| | Wt. percent siloxane in blend | Wt. percent polyether triol S2 in blend | | |
| *Siloxanes of this invention:** | | | | |
| Siloxane I | 5 | 95 | Clear | 11 |
| | 20 | 80 | ...do | 11 |
| Siloxane II | 20 | 80 | ...do | 8 |
| Siloxane III | 5 | 95 | ...do | 13 |
| Siloxane IV | 5 | 95 | ...do | 18 |
| Siloxane V | 5 | 95 | ...do | 27 |
| Siloxane VI | 5 | 95 | ...do | 35 |
| Siloxane VII | 5 | 95 | ...do | 7 |
| Siloxane VIII | 10 | 90 | ...do | 36 |
| Siloxane IX | 20 | 80 | ...do | 7 |
| Siloxane X | 20 | 80 | ...do | 6 |
| *Siloxanes not of this invention:* | | | | |
| Siloxane A | 3 | 97 | Slightly turbid | 5 |
| Siloxane A | 5 | 95 | Very turbid | 5 |
| Siloxane B | 1 | 1 | ...do | 7 |
| Siloxane C | 5 | 5 | ...do | 57 |
| Siloxane D | 5 | 5 | ...do | 44 |
| Siloxane E | 5 | 5 | Slightly turbid | 47 |

*Not maximum solubilities for Siloxanes I through X.

EXAMPLE 17

This example illustrates the superior solubility of Siloxane II over siloxane oils not of this invention in various solvent solutions. The results of the blends are reported in the following table.

TABLE 9

| Siloxane oil | Solvent | Wt. percent siloxane in blend | Wt. percent solvent in blend | Appearance of blend |
|---|---|---|---|---|
| Siloxane II | S2 | 10 | 90 | Clear. |
| Do | S1 | 10 | 90 | Do. |
| Do | S3 | 10 | 90 | Do. |
| Siloxane A [1] | S2 | 3 | 97 | Slightly turbid. |
| Do.[1] | S1 | 3 | 97 | Very turbid. |
| Do.[1] | S3 | 3 | 97 | Do. |

[1] Siloxane not of this invention.

EXAMPLE 18

A series of high resilience polyether urethane foams was produced in the same manner as Example 12 using the same foam formulation except that Siloxanes VII to X were employed. Moreover, Siloxane VII was employed in the form of a siloxane oil-solvent solution composed of about 95 parts by weight of solvent S2 and about 5 parts by weight of Siloxane VII, while Siloxanes VIII to X were not employed in the form of a solvent solution, the solvent for these siloxane oils being omitted. The active amount of siloxane oil was also varied and the results obtained are reported in the following table.

TABLE 10

| Foam No. | Siloxane oil | Active siloxane conc. (p.h.p.) | Cells per inch | Shrinkage | Cell uniformity |
|---|---|---|---|---|---|
| 1 | Non (control). | | 10 | None | Severe voids—irregular. |
| 2 | Siloxane VII | 0.10 | 40 | ...do | Uniform—No voids. |
| 3 | Siloxane VIII | 0.05 | 40 | ...do | Do. |
| 4 | Siloxane IX | 0.12 | 36 | ...do | Do. |
| 5 | Siloxane X | 0.12 | 30 | ...do | Do. |

The above data in Examples 12 to 15 and 18 demonstrate that the irregular cell structure and voids of control foams can be eliminated by employing the siloxane oil stabilizers of this invention without causing any foam shrinkage. Moreover the above data in Example 15 demonstrates that while the use of siloxane oils not of this invention helped eliminate the voids of the control foam, they also caused moderate or severe foam shrinkage and therefore are not useful as stabilizers in the production of high resilience polyether urethane foam. In cases of moderate foam shrinkage the normally smooth regular crown is substantially puckered and wrinkled. This surface shrinkage is related to an abnormal quantity of closed cells and tight foam which in turn adversely effects the foams properties such as its resiliency, compression set and load bearing. In cases of severe shrinkage the above defects and disadvantages are even more aggravated and pronounced. In addition severe shrinkage is further evidenced by a pulling away of the foam from the sides and/or bottom of the mold.

The data in Examples 16 and 17 demonstrate that the siloxane oils of this invention are highly soluble in various organic solvents, which siloxane oils not of this invention are only slightly soluble in the same solvents. Thus it is obvious that reasonable amounts of solvent solutions of the siloxane oils of this invention can be employed in the production of high resilience polyether urethane foams, whereas not enough of the silixone oils, not of this invention, can be dissolved in the same solvents to provide for stabilization at practicle solution concentrations in the production of said foams.

Various modifications and variations of this invention will be obvious to a worker skilled in the art and it is to be understood that such modifications and variations are to be included within the purview of this application and the spirit and scope of the appended claims.

What is claimed is:

1. An aralkyl modified siloxane oil having the average formula $$(X)_zR_{3-z}SiO(R_2SiO)_x[(X)(R)SiO]_ySiR_{3-z}X_z$$

wherein $x$ has a value of 2 to 8 inclusive; $y$ has a value of 0 to 6 inclusive; $z$ has a value of 0 to 1 inclusive; R is a lower alkyl or phenyl radical; and X is an aralkyl radical of the formula

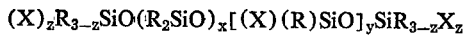

where $a$ has a value of 2 or 3; said siloxane containing at least one of said aralkyl radicals and having a viscosity in the range of about 4 to about 40 centistokes at 25° C.

2. A siloxane oil as defined in claim 1 having a viscosity in the range of about 5 to about 20 centistokes at 25° C.

3. A siloxane oil as defined in claim 1 wherein z is 0 and R is a lower alkyl radical.

4. A siloxane oil as defined in claim 3 wherein R is a methyl radical, and X is

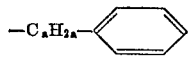

5. A siloxane oil as defined in claim 1 wherein z is 1 and R is a lower alkyl radical.

6. A siloxone oil as defined in claim 5, wherein R is a methyl radical.

7. A siloxane oil as defined in claim 3, wherein R is a methyl radical, and X is

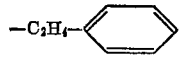

8. A siloxane oil as defined in claim 1 having the average formula

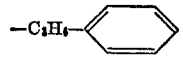
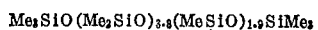
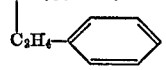

wherein Me is a methyl radical.

9. A siloxane oil as defined in claim 1 having the average formula

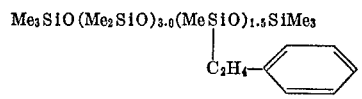

wherein Me is a methyl radical.

10. A siloxane oil as defined in claim 1 having the average formula

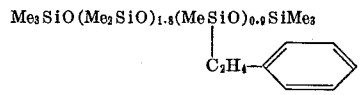

wherein Me is a methyl radical.

11. A siloxane oil as defined in claim 1 having the average formula

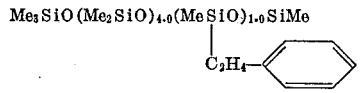

wherein Me is a methyl radical.

12. A siloxane oil as defined in claim 1 having the average formula

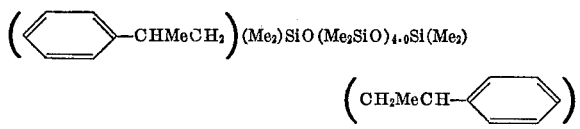

wherein Me is a methyl radical.

13. A siloxane oil as defined in claim 1 having the average formula

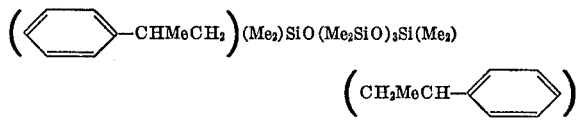

wherein Me is a methyl radical.

14. A siloxane oil as defined in claim 1 having the average formula

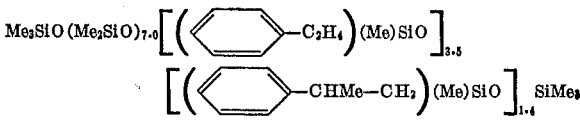

wherein Me is a methyl radical.

References Cited

UNITED STATES PATENTS 3,532,730  10/1970  Culpepper _____ 260—448.2 R
3,221,040  11/1965  Pater _____ 260—448.2 R DANIEL E. WYMAN, Primary Examiner P. F. SHAVER, Assistant Examiner U.S. Cl. X.R.

252—49.6, 78; 260—2.5 AH, 448.2 R

UNITED STATES PATENT OFFICE
CERTIFICATE OF CORRECTION

Patent No. 3,839,384                     Dated October 1, 1974

Inventor(s) E. T. Morehouse

It is certified that error appears in the above-identified patent and that said Letters Patent are hereby corrected as shown below:

Column 6, line 60 "NCO" should read --NCO--.

Column 8, line 16, "diproylene" should read --dipropylene--.

Column 12, TABLE 2 in the formula of Siloxane III after the last bracket "1.4" should read --1.1--.

Column 12, TABLE 2, in the formula of Siloxane IV after "SiO)", " 3.0" should read --3.8--.

Column 17, line 9, "which" should read --while--.

Signed and sealed this 18th day of February 1975.

(SEAL)
Attest:

RUTH C. MASON
Attesting Officer

C. MARSHALL DANN
Commissioner of Patents
and Trademarks